US009323389B2

(12) United States Patent
Mabie et al.

(10) Patent No.: US 9,323,389 B2
(45) Date of Patent: Apr. 26, 2016

(54) ADAPTIVE TOUCHSCREEN SYSTEM

(71) Applicant: Garmin International, Inc., Olathe, KS (US)

(72) Inventors: Ted D. Mabie, Olathe, KS (US); David M. Dixon, Overland Park, KS (US); Clayton C. Vondrasek, Lenexa, KS (US); Joseph L. Komer, Shawnee, KS (US)

(73) Assignee: Garmin International, Inc., Olathe, KS (US)

( * ) Notice: Subject to any disclaimer, the term of this patent is extended or adjusted under 35 U.S.C. 154(b) by 0 days.

(21) Appl. No.: 14/951,248

(22) Filed: Nov. 24, 2015

(65) Prior Publication Data

US 2016/0085376 A1 Mar. 24, 2016

Related U.S. Application Data

(63) Continuation of application No. 13/277,727, filed on Oct. 20, 2011, now Pat. No. 9,229,575.

(51) Int. Cl.
*G06F 3/041* (2006.01)
*G06F 3/042* (2006.01)
*G06F 3/0488* (2013.01)
*G06F 3/0484* (2013.01)
*G06F 3/0482* (2013.01)

(52) U.S. Cl.
CPC ............ *G06F 3/0418* (2013.01); *G06F 3/0421* (2013.01); *G06F 3/0482* (2013.01); *G06F 3/04842* (2013.01); *G06F 3/04883* (2013.01)

(58) Field of Classification Search
CPC .................. G06T 2207/30148; G06T 7/0004; G06T 7/001; G06T 2207/30164; G06T 11/00; G06T 2200/24; G06T 2207/10024; G06T 2207/10108; G06T 2207/20076; G06T 2207/20148; G06T 2207/20221; G06T 7/0002; G06T 7/0083; G09G 3/006; G09G 2320/0261; G09G 2330/08; G09G 2330/10; G09G 2340/0407; G09G 2370/04; G09G 2380/08; G09G 3/20; G09G 3/36; G09G 3/3648; G09G 5/005; G09G 5/363
USPC ................. 345/173–184; 178/18.09; 715/709
See application file for complete search history.

(56) References Cited

U.S. PATENT DOCUMENTS

| | | | | |
|---|---|---|---|---|
| 4,855,590 A | | 8/1989 | Bures et al. | 250/221 |
| 5,179,369 A | * | 1/1993 | Person | G06F 3/0421 250/221 |
| 6,285,359 B1 | | 9/2001 | Ogasawara et al. | 345/175 |
| 6,429,857 B1 | | 8/2002 | Masters et al. | 345/175 |
| 6,677,934 B1 | | 1/2004 | Blanchard | 345/175 |
| 6,690,363 B2 | * | 2/2004 | Newton | G06F 3/0421 178/18.01 |
| 7,068,858 B2 | * | 6/2006 | Allen | G09G 3/002 359/292 |
| 8,243,038 B2 | * | 8/2012 | Ciesla | G06F 3/016 178/18.01 |
| 8,264,376 B1 | | 9/2012 | McLoughlin et al. | 340/945 |
| 8,279,197 B2 | | 10/2012 | Murphy et al. | 345/174 |

(Continued)

*Primary Examiner* — Amare Mengistu
*Assistant Examiner* — Gloryvid Figueroa-Gibson
(74) *Attorney, Agent, or Firm* — Samuel M. Korte; Max M. Ali

(57) ABSTRACT

A touchscreen system for adapting a user interface broadly comprises a controller and a display screen, the display screen comprising a touchscreen. The display screen is operable to present the user interface. The controller may be configured to detect a defect in an area of the touchscreen, determine a location on the display screen related to the defect, and adapting the user interface on the display screen to compensate for the defect.

20 Claims, 8 Drawing Sheets

(56) References Cited

U.S. PATENT DOCUMENTS

| | | | | |
|---|---|---|---|---|
| 2004/0174320 A1* | 9/2004 | Matthijs | G09G 3/006 | 345/30 |
| 2007/0081739 A1* | 4/2007 | Wilbrink | G09G 3/20 | 382/275 |
| 2008/0238936 A1 | 10/2008 | Kim | | 345/618 |
| 2009/0184935 A1* | 7/2009 | Kim | G06F 3/0488 | 345/173 |
| 2011/0084939 A1 | 4/2011 | Gepner et al. | | 345/175 |
| 2011/0115720 A1 | 5/2011 | Klein et al. | | 345/173 |
| 2012/0105358 A1* | 5/2012 | Momeyer | G06F 3/0414 | 345/174 |
| 2014/0320437 A1* | 10/2014 | Kang | G09G 5/373 | 345/173 |
| 2015/0015495 A1* | 1/2015 | Narayanaswami | G06F 3/0418 | 345/173 |
| 2015/0193074 A1* | 7/2015 | Cudak | G06F 3/0418 | 345/173 |

* cited by examiner

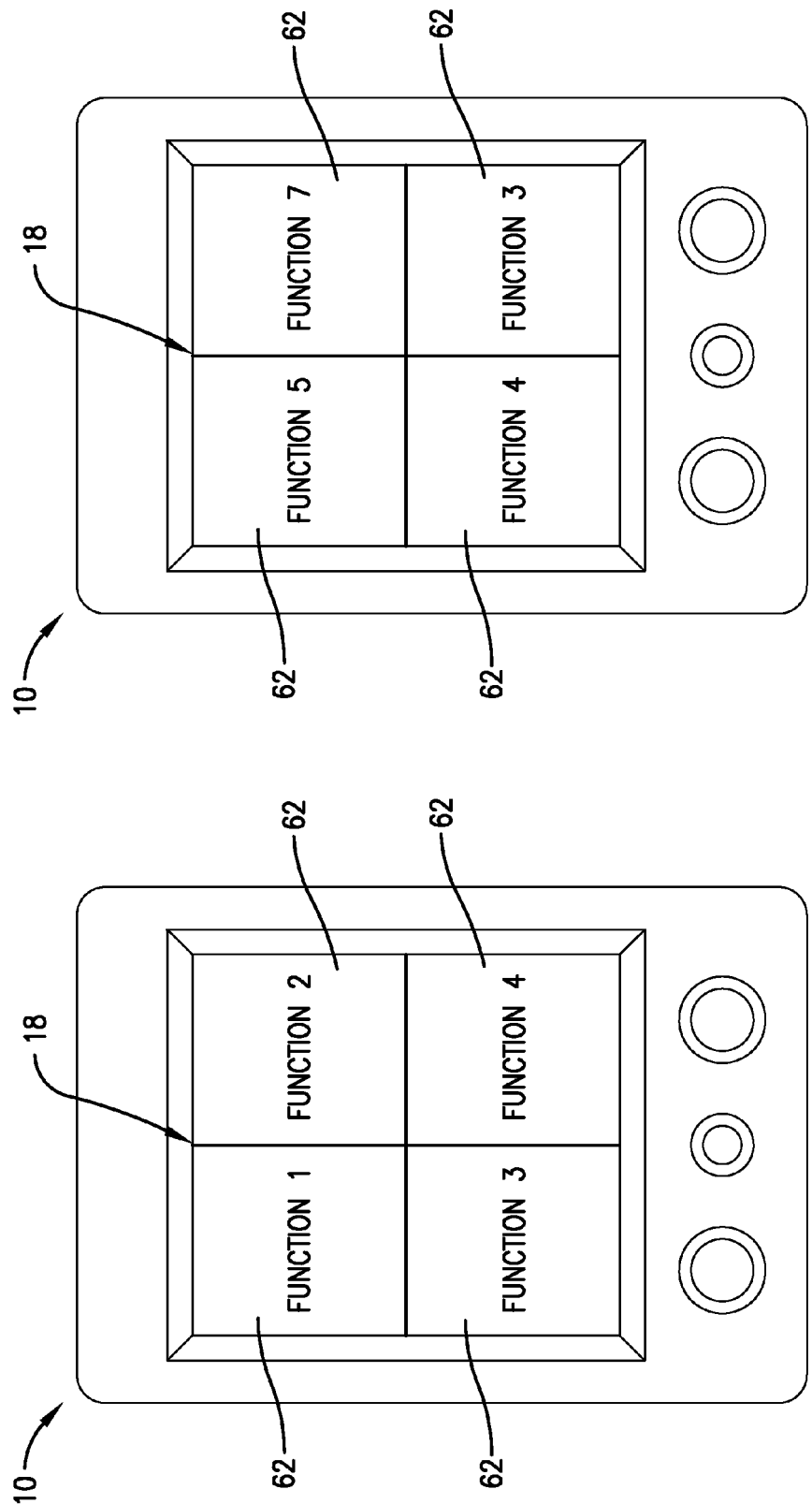

ADAPTIVE TOUCHSCREEN SYSTEM

RELATED APPLICATIONS

The present application is a continuation of, and claims priority benefit to, co-pending and commonly assigned U.S. non-provisional patent application entitled, "ADAPTIVE TOUCHSCREEN SYSTEM," application Ser. No. 13/277,727, filed Oct. 20, 2011. The above application is hereby incorporated by reference into the current application in its entirety.

BACKGROUND

Embodiments of the present technology relate to touchscreen systems that utilize optoelectronic devices to detect touches on a display screen. Touchscreen systems typically include a display screen that presents information to a user and touchscreen electronics for detecting touches on the display screen. The touchscreen system may be attached to or otherwise coupled with the display screen of an electronic device that performs various functions and controls the information displayed on the display screen. The user may respond to questions, enter data, or otherwise operate the electronic device by touching or physically contacting a portion of the touchscreen.

SUMMARY

Fingerprints, dust, and other debris often accumulate on touchscreen systems and interfere with their operation, sometimes resulting in the touchscreen system being unable to accurately recognize an interactive touch. If the debris is not removed and/or the display screen is not cleaned in a timely fashion, then the touchscreen system may not function in a flawless manner because at least a portion of a user interface presented on the display screen may be inaccessible using the touchscreen.

Embodiments of the present technology provide a touchscreen system that detects when the system has a defect that prohibits the ideal recognition of touches in a certain area of the touchscreen and alerts a user of this condition. An embodiment of the touchscreen system broadly comprises a display and a controller. The display is operable to display a touch-sensitive user interface. The controller may be configured to detect a defect in an area of the touchscreen, determine a location on the display related to the defect, and present the user interface on the display screen in areas other than in the location of the defect.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein:

FIG. 13 is a top view of the electronic device with the user interface presenting a reduced number of functional components to account for a defect.

FIG. 14 is a top view of the electronic device with the user interface presenting a reduced number of high-priority functional components to account for a defect.

Figure 1:
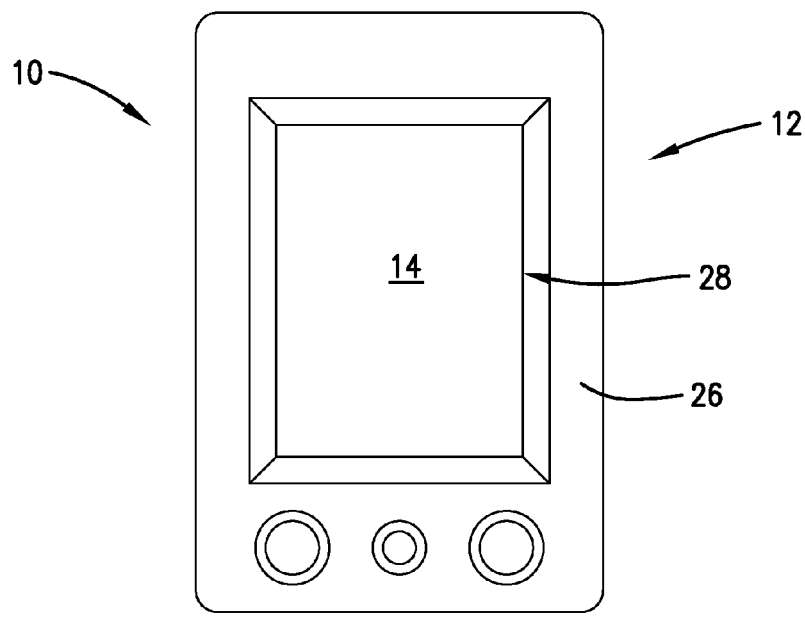
FIG. 1 is a top view of an electronic device in which the touchscreen system and method of the present technology may be implemented.

The drawing figures do not limit the present technology to the specific embodiments disclosed and described herein. The drawings are not necessarily to scale, emphasis instead being placed upon clearly illustrating the principles of the technology.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present technology provide a touchscreen system for an electronic device that may adapt its user interface to account for touchscreen defects. Under normal operation, the electronic device may present the user interface over most of the viewable area of a display screen associated with the touchscreen. The user interface may include text and graphics that form menus, lists, dialog boxes, prompts, virtual control panels, and the like that encourage or request a user to input data, respond to questions, or otherwise interact with the touchscreen system by physically touching the touchscreen or areas in proximity thereto. Generally, any viewable area of the display screen may be utilized to present the user interface that prompts the user to provide a touch input to the touchscreen.

In certain situations, however, a portion of the display screen may become unable to recognize touch inputs on the touchscreen due to a defect. The defect may include foreign objects on the touchscreen, or a malfunction of the touchscreen system. For example, with implementations of touchscreen system using resistive touchscreen technologies, foreign objects may apply pressure to the touchscreen and cause the false recognition of a touch input that must be ignored. With implementations of touchscreen system using capacitive touchscreen technologies, conductive objects, such as fingerprints, on the touchscreen may generate a false touch input. With implementations of touchscreen system using infrared (IR) technologies, debris, dust, or condensation on the touchscreen may block one or more IR transmitters or receivers and generate a false touch input. With any of these technologies, defects in touchscreen coatings or films or failures with optical components may create a false touch input. Under such circumstances, the touchscreen system may detect a touch input that lasts for longer than a certain period of time. In some implementations, the display screen and touchscreen comprise the same physical space, such that the defect may be simultaneously found on the touchscreen and display screen. Thus, for instance, a defect in an area of an IR touchscreen may comprise debris resting on a LCD display screen even though the LCD display screen is generally surrounded by IR sensors at its periphery.

In some embodiments, the touchscreen system may identify the length of time for a customary touch input. Any touch input that lasts for longer than an identified period of time may be deemed a false touch input. For example, a touch input may be deemed a false touch input if the identified period of time is 5 seconds and the touch input lasts 10 seconds. As a result, the touchscreen system may then associate the location on the touchscreen of the false touch input to be, at least temporarily, inoperable due to the defect.

In order to maintain the functionality of the touchscreen system, the system may reconfigure the user interface to be presented on the display screen in areas that are not deemed inoperable. In some situations, the touchscreen system may scale at least a portion of the user interface to be presented in a smaller area on the display screen in the horizontal direction, the vertical direction, or both. In other situations, the touchscreen system may remap the user interface based on a priority of a functionality presented on the user interface. If one or more functions presented on the user interface in the area of the defect have a lower priority, then the touchscreen system may remove a low priority function in the area of the defect—thereby losing the lower-priority functionality. If one or more functions presented on the user interface in the area of the defect have a higher priority, then the touchscreen system may present a high-priority function in an area of the user interface that is not associated with the touchscreen system defect, which may have previously presented a lower-priority function on the user interface—thereby moving a high priority functionality to a functioning area of the touchscreen system. The touchscreen system would maintain its higher-priority functionality while losing some lower-priority functionality.

Embodiments of the technology will now be described in more detail with reference to the drawing figures. Referring initially to FIG. 1, an electronic device 10 in which the touchscreen system 12 of the present technology may be integrated is illustrated. Embodiments of the touchscreen system 12 may broadly comprise a display screen 14 and a controller 16, as seen in FIGS. 1-4. The touchscreen system 12 may work in combination with a user interface 18, embodiments of which are presented in FIGS. 6 and 7, to be presented on the display screen 14. Although the principles of the present invention are operable with many types of touchscreen systems, such as capacitive and resistive, embodiments of the present invention will be illustrated in operation with an infrared (IR) touchscreen technology. Thus, the electronic device 10 may further comprise a plurality of transmitters 20 and a plurality of receivers 22, as seen in FIGS. 2-5, to implement the touchscreen system 12.

The electronic device 10 may be any device that presents visual information to a user and with which the user may interact by providing a touch input. Examples of the electronic device 10 include commercial, retail, or public information kiosks located in banks, shopping malls, airports, and the like, computing devices such as a desktop computer, tablet computer, or a laptop computer, medical test or diagnostic equipment used in a hospital or laboratory, navigation and instrumentation equipment used in an aircraft, marine vessel, or automobile, portable electronics such as mobile phones and personal devices, and similar electronic components.

The electronic device 10 may also include components not necessarily shown in the figures, such as inputs, outputs, and communication ports. Inputs may include knobs, dials, switches, keypads, keyboards, mice, joysticks, combinations thereof, and the like. Outputs may include audio speakers, lights, dials, meters, printers, combinations thereof, and the like. Communication ports may be wired or wireless, electronic, optical, radio frequency (RF), combinations thereof, and the like.

Figure 4:
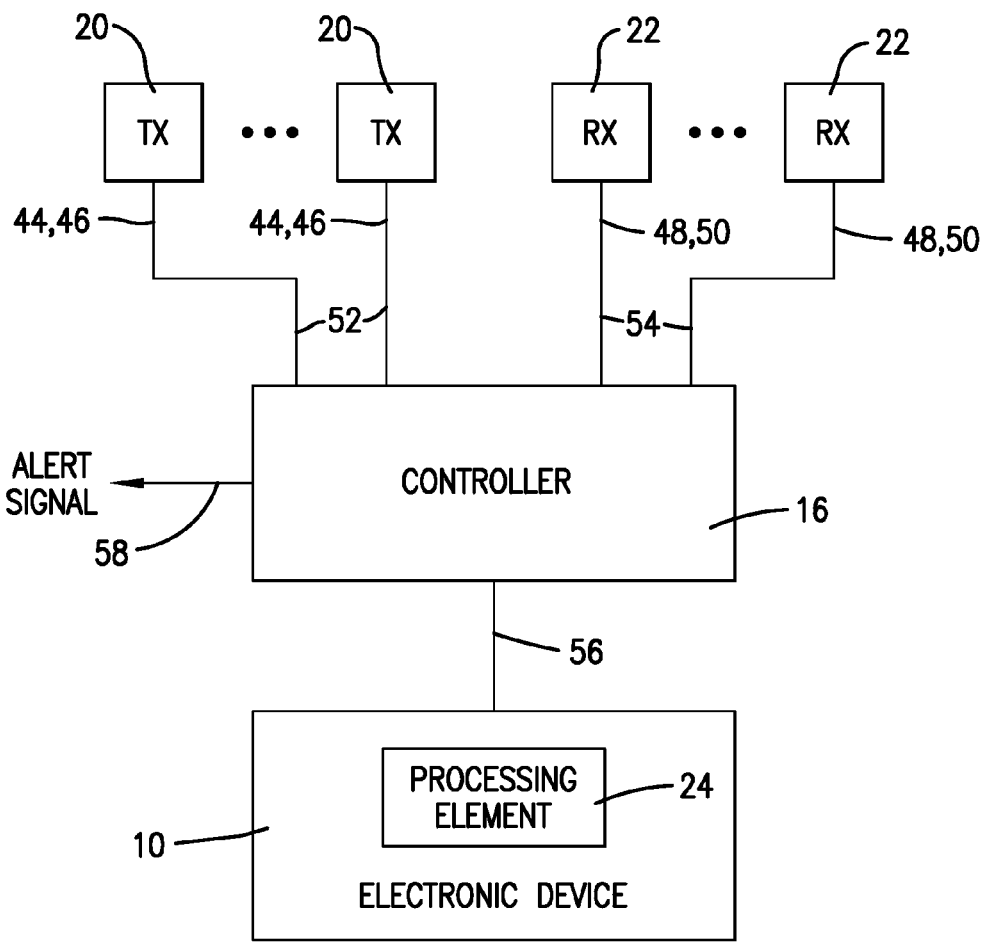
FIG. 4 is a block diagram of the electronic device and the touchscreen system in accordance with various embodiments of the present technology.

As shown in FIG. 4, embodiments of the electronic device 10 may also include a processing element 24 that performs logical functions and controls the information presented on the display screen 14. The presented information may depend on computer programs, software, or code that is executed by the electronic device 10, input from users utilizing the inputs discussed above, input from the receivers 22 that is generated from users touching the display screen 14, and combinations thereof. The processing element 24 may include processors, microprocessors, microcontrollers, field-programmable gate arrays (FPGAs), or similar components that are capable of executing computer programs, applications, software, or code. The processing element 24 may further include data storage components such as read-only memory (ROM), random-access memory (RAM), hard-disk drives, optical disk drives, flash memory drives, combinations thereof, and the like.

Figure 2:
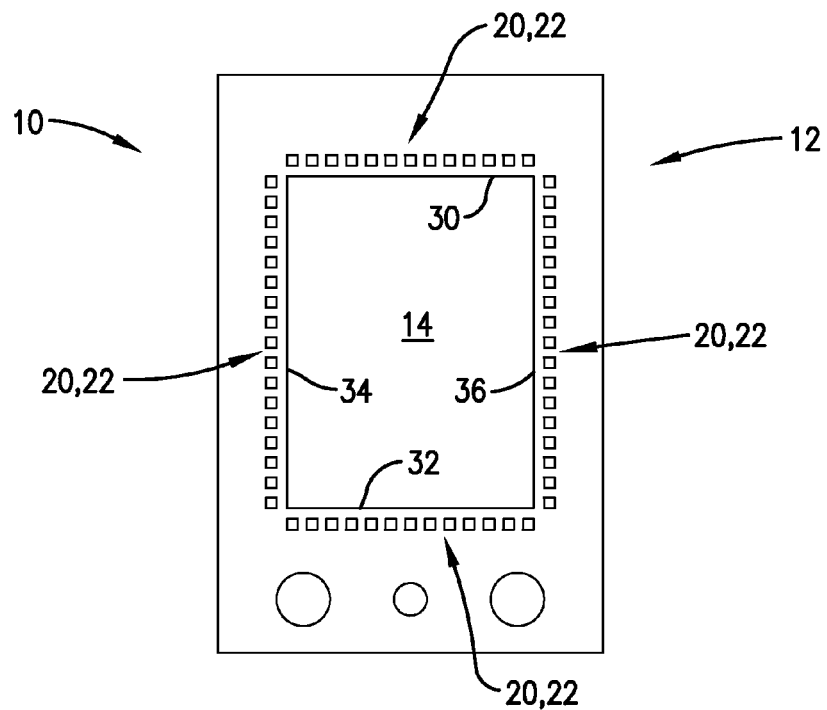
FIG. 2 is a top view of the electronic device of FIG. 1 with a front cover removed to show the transmitters and receivers of the touchscreen system positioned adjacent to the edges of the device's display screen.

The electronic device 10 may further include a cover 26 that is shown in FIG. 1, but is removed in FIG. 2 to reveal the transmitters 20 and the receivers 22. The cover 26 generally provides protection for the transmitters 20, the receivers 22, the display screen 14, and any other components in the vicinity thereof. In some embodiments, the cover 26 may include or form a bezel around display screen 14. The cover 26 may have a shape that conforms to a housing or a body of the electronic device 10 to which the cover 26 may be attached. The cover 26 may include a window 28 or opening that aligns with the display screen 14. The window 28 may have a similar size and aspect ratio as the display screen 14.

Figure 3:
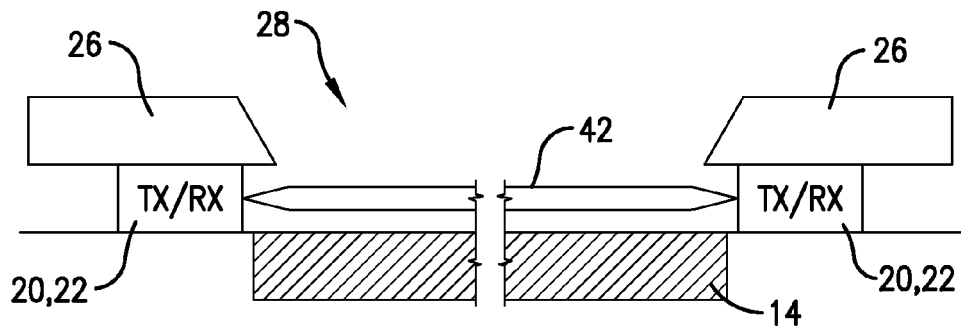
FIG. 3 is a schematic sectional view of the touchscreen system showing the transmitters and receivers positioned at the perimeter of the display screen and underneath the front cover of the electronic device.

As stated above, the principles of the present invention are operable with many types of touchscreen systems 12, such as infrared touchscreen, capacitive touchscreen, and resistive touchscreen. Embodiments of the present invention may employ resistive touchscreen, capacitive touchscreen, or similar configurations where portions of a touchscreen panel are positioned above the display screen 14. Embodiments of the present invention implementing infrared touchscreen technology as touchscreen system 12 may use a cover 26 shaped so that the window 28 does not contact the display screen 14 and allows some space in order to accommodate the operation of the transmitters 20 and the receivers 22. In some embodiments, the space between the window 28 and the display screen 14 may be empty. In other embodiments, a transparent gasket or seal may be placed between the window 28 and the display screen 14. Furthermore, when the touchscreen system 12 is finally assembled, the cover 26 may be positioned over the transmitters 20 and the receivers 22, as seen in FIG. 3. Accordingly, the transmitters 20 and the receivers 22 may not be visible or accessible.

The display screen 14 may display the user interface 18, which presents user input options enabling the user to interact with the electronic device 10. The user interface 18 is generally anything that is presented on the display screen 14 and may include questions or statements that prompt the user to enter a touch input using infrared technology (the transmitters 20 and the receivers 22) or a touchscreen panel. The user interface 18 may also include on-screen keyboards, numeric or alphanumeric keypads, menuing systems, popup windows, buttons, icons, selectable graphics, virtual control panels, and the like. Thus, the user may enter a touch input to respond to prompts or questions, type text, enter numbers, activate menus, open windows or dialog boxes, scroll through lists, or similar activities. Thus, the electronic device 10 may be controlled by or may operate in response to touch inputs provided to the touchscreen system 12.

The display screen 14 may be of a variety of types, including, but not limited to, a cathode ray tube (CRT), plasma, light-emitting diode (LED), organic LED (OLED), LEP (Light Emitting Polymer) or PLED (Polymer LED), liquid crystal display (LCD), thin film transistor (TFT) LCD, LED side-lit or back-lit LCD, combinations thereof, and the like. In various embodiments, the display screen 14 may be integral with the electronic device 10, as shown in FIGS. 2-3 and exemplified by a device such as a multi-use avionics system controller. In other embodiments, the display screen 14 may be separate from the electronic device 10, such as with a computer monitor or other video monitor.

The display screen 14 is generally flat to accommodate the operation of the transmitters 20 and the receivers 22, as discussed in more detail below. The display screen 14 may have multiple sides but is typically four-sided with a top side 30, a bottom side 32, a left side 34, and a right side 36. The display screen 14 may possess a square or a rectangular aspect ratio and may be viewed in either a landscape or a portrait mode.

Furthermore, the display screen 14 may include a first axis and a second axis. The first axis may be either horizontal or vertical and may be oriented parallel to one of the sides 30, 32, 34, 36. The second axis may be either horizontal or vertical but generally orthogonal to the first axis and may be oriented parallel to an orthogonal one of the sides 30, 32, 34, 36.

Figure 5:
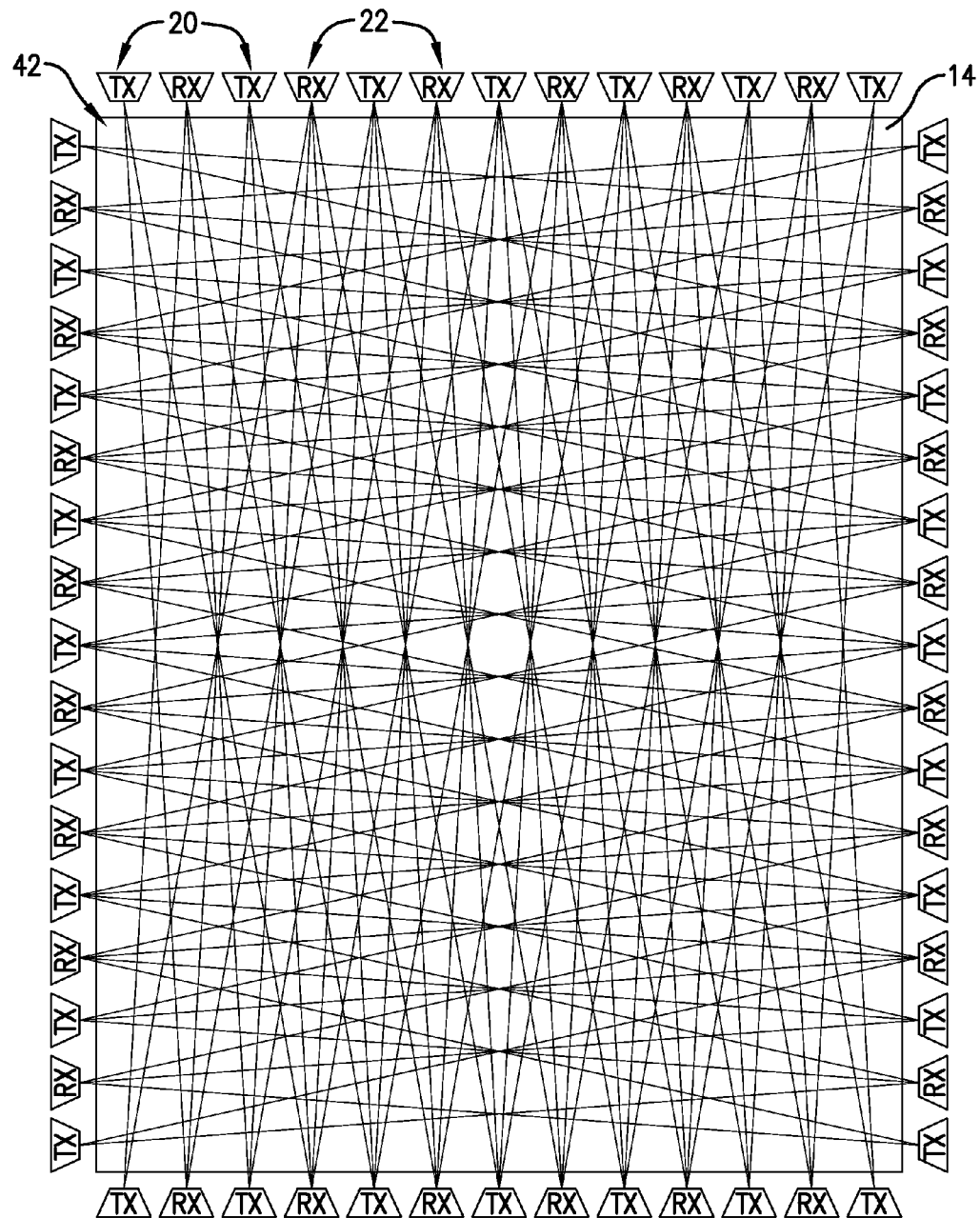
FIG. 5 is a schematic view of the display screen, the transmitters, and the receivers depicting a beam pattern created by the touchscreen system.

The transmitters 20, also designated as "TX", and the receivers 22, also designated as "RX", may be positioned along all sides of the perimeter of the display screen 14 as seen in FIGS. 2 and 5 such that the transmitters 20 may transmit beams 42 across the display screen 14 to the receivers 22, as shown in FIGS. 3 and 5. Typically, the transmitters 20 and the receivers 22 are placed such that they are adjacent to the entire perimeter of the display screen 14. Accordingly, the number of transmitters 20 and receivers 22 may depend on the length of the perimeter, the size of each transmitter 20 and receiver 22, and the space between each device. Other factors may influence the number of transmitters 20 and receivers 22, such as minimizing power consumption of the touchscreen system 12, in which case the number of transmitters 20 and receivers 22 may be reduced.

Generally, the transmitters 20 and the receivers 22 are placed with the transmitters 20 being interleaved with the receivers 22, such that one receiver 22 is positioned between two transmitters 20 and vice versa. The beam 42 from the transmitter 20 may have a conical shape in general or a triangular shape when viewed in a plane. Thus, the beam 42 from one transmitter 20 may reach several receivers 22 on the other side of the display screen 14. As a result, several beams 42 may be formed between one transmitter 20 and the receivers 22 on the opposing side. For example, as seen in FIG. 5, one beam 42 may be formed between one transmitter 20 and each of four receivers 22 to produce a total of four beams 42, although this number may decrease near the corners of the display screen 14. Furthermore, each receiver 22 may receive a beam 42 from multiple transmitters 20. Hence, there may be multiple beams 42 that lead to one receiver 22. For example, as seen in FIG. 5, each receiver 22 may receive four beams 42, except in the vicinity of the corners of the display screen 14 where the number of beams 42 per receiver 22 decreases.

In various embodiments, the transmitters 20 may be positioned along one side of the display screen 14 substantially linearly aligned with the transmitters 20 along the opposite side of the display screen 14. Likewise, the receivers 22 may be substantially linearly aligned with receivers 22 along opposing sides of the display screen 14. This orientation may produce the pattern of beams 42 shown in FIG. 5. However, the touchscreen system 12 may function properly with other orientations of transmitters 20 and receivers 22, which, along with the resultant pattern of beams 42, are within the scope of the infrared touchscreen system 12.

Each of the transmitters 20 generally transmits a beam 42 that corresponds to a transmit signal 44 from the controller 16. The transmit signal 44 may be received by a transmitter input 46. Each transmitter 20 may receive the transmit signal 44, either as a voltage or a current, from the controller 16 and generate the corresponding beam 42 with an intensity that is proportional to the magnitude of the transmit signal 44—typically in the infrared (IR) wavelength range of approximately 700 nanometers (nm) to approximately 1500 nm. The beam 42 may be considered to be an optical transmission and thus the transmitter 20 may include light-emitting diodes (LEDs), surface-emitting or edge-emitting lasers, similar optoelectronic devices, or combinations thereof.

The transmit signal 44 from the controller 16 and the corresponding beam 42 may be generated at a constant level or, more often, a varying level, wherein the beam 42 is turned on and off in a pattern. The important function for the transmitter 20 is to produce a beam 42 that is capable of being interrupted or broken.

Each of the receivers 22 may produce a receive signal 48 that is communicated through a receiver output 50 and corresponds to radiation detected by a sensing surface of the receiver 22. The receiver 22 may include photodetectors, photocells, phototransistors, photoresistors, photodiodes, other photosensitive materials that may detect IR radiation, or combinations thereof. The receiver 22 may produce the receive signal 48 as an analog electrical or electronic output, either voltage or current, that corresponds to the detected radiation.

The receive signal 48 may generally correspond to or somewhat resemble the transmit signal 44 while the beam 42 is unbroken and received by the receiver 22. Thus, the receive signal 48 may indicate when the beam 42 is broken and not received by the receiver 22. A user's finger substantially touching the display screen 14 may break one or more of the beams 42 to indicate the presence of a touch input.

The controller 16 may include digital to analog converters (DACs), analog to digital converters (ADCs), signal amplifiers, drivers, similar electrical or electronic circuits, or combinations thereof. The controller 16 generally sends the transmit signal 44 to the transmitters 20 and receives the receive signal 48 from the receivers 22. Accordingly, the controller 16 may include a plurality of outputs 52 that are coupled to the transmitter inputs 46 and a plurality of inputs 54 that are coupled to the receiver outputs 50. The transmit signal 44 and the receive signal 48 may include a variable analog voltage or current level.

The controller 16 may also include a data output 56 to send information to the electronic device 10, such as the location associated with the display screen 14 where a touch input was received. In order to determine the location of a touch input and perform other functions, the controller 16 may execute computer programs, software, code, instructions, algorithms, or firmware, and combinations thereof. The controller 16 may include circuitry, such as finite state machines (FSMs), that automatically performs instructions. The controller 16 may also include processors, microprocessors, microcontrollers, field-programmable gate arrays (FPGAs), application-specific integrated circuits (ASICs), combinations thereof, and the like, and may be implemented using hardware description languages (HDLs), such as Verilog and VHDL. The controller 16 may further include data storage components such as read-only memory (ROM), random-access memory (RAM), hard-disk drives, optical disk drives, flash memory, combinations thereof, and the like. In addition, the controller 16 may include communication ports to allow for programming or other miscellaneous functions.

During operation, the controller 16 may analyze the status of one or more of the receive signals 48. Because the receive signal 48 from each receiver 22 is supposed to have a variable periodic amplitude in response to the periodic beam 42 transmitted by the transmitters 20, a defect may be indicated when a receive signal 48 is stuck at a known value for longer than a customary period of time (e.g., 2 seconds, 5 seconds, 10 seconds, etc.), or if the receive signal 48 is stuck at an intermediate value. The defect may be the result of foreign objects (dust, condensation, or the like) present on the display screen 14 or other portions of the touchscreen system 12, and blocking one or more beams 42, leading to one or more receive signals 48 being stuck. The controller 16 may employ the techniques for detecting foreign objects that are disclosed in U.S. patent application Ser. No. 13/215,752, entitled "SYSTEM AND METHODS FOR DETECTING DEBRIS ON A TOUCHSCREEN SYSTEM DISPLAY SCREEN" and filed on Aug. 23, 2011, which is hereby incorporated by reference into the current application in its entirety.

In addition, the defect may also be the result of one or more transmitters 20 and/or receivers 22 not functioning properly during operation of the electronic device 10. By comparing the level of the receive signals 48 with expected levels in combination with other techniques, such as monitoring power supply current, or by analyzing the pattern of which receive signals 48 are stuck, the controller 16 may determine that one or more receivers 22 and/or transmitters 20 are malfunctioning. For capacitive and resistive systems, the controller 16 may detect the presence of a defect in an area of the touchscreen system 12 by identifying unexpected resistive or capacitive signals, such as signals indicating a touch input duration exceeding a customary period of time (e.g., 2 seconds, 5 seconds, 10 seconds, etc.).

Once the controller 16 has a defect in the area of the touchscreen system 12, the controller 16 may then determine a location on the display screen 14 related to the defect, such as the area of the display screen 14 that has been affected by the defect. For example, the controller 16 may analyze which receive signals 48 are stuck and then perform calculations to determine the location of the defect based on the positions of the affected receive signals 48. Furthermore, each area of the display screen 14 may be identified by a specific combination of receive signals 48. The controller 16 may alternatively or additionally utilize stored data, such as a lookup table, to determine the area of the defect based on the combination of stuck receive signals 48. The controller 16 may also employ other algorithms to determine the location of the defect.

In various embodiments, the controller 16 may also be programmed to generate an alert signal 58 indicating that the display screen 14 needs to be examined and, in some instances, cleaned. The alert signal 58 may include a flashing light or a prompt on the display screen 14, a message sent to an external monitor, an audio alert, or the like, and combinations thereof. The controller 16 may control the display screen 14, or at least a portion of the display screen 14, to indicate the position on the display screen 14 where the defect may be located. For example, the controller 16 may display a box or a circle on the display screen 14 where the display screen 14 should be cleaned. In some embodiments, the controller 16 may identify the type of defect, such as debris, film, condensation, frost, etc.

It is possible that the user may not be able to clean the display screen 14 or inspect the receivers 22 and transmitters 20 promptly once a defect has been detected. Particularly in the case of a spill on the display screen 14, or if a transmitter 20 or receiver 22 is malfunctioning, the defect may not be correctable quickly by cleaning the display screen 14, receivers 22, or transmitters 20. Therefore, once the controller 16 has determined that there is a defect of the touchscreen system 12, the controller 16 may reconfigure the user interface 18 to be presented in areas of the display screen 14 that are not affected by the defect. Even though the defect may prevent the touchscreen system 12 from receiving a touch input in a particular area of the display screen 14, the controller 16 may display a warning label or other indicator 60, such as presenting an "X", as shown in FIGS. 7-11, in the area associated with the defect, or as discussed above, controller 16 may also present an indication of an area of the touchscreen system 12 that should be inspected and/or cleaned.

Figure 6:
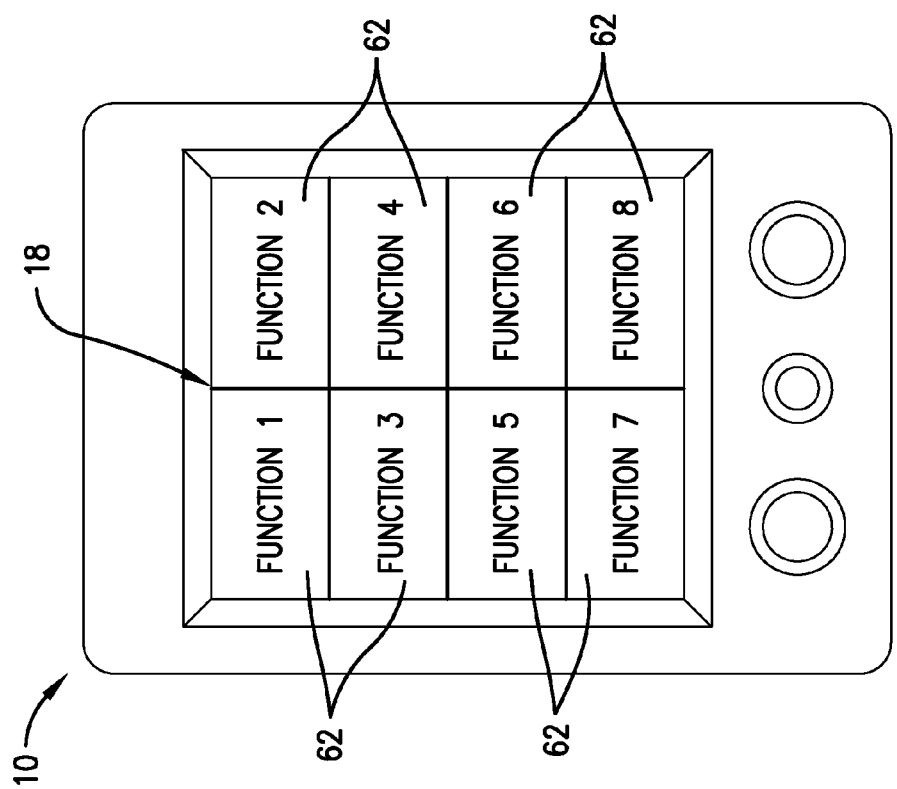
FIG. 6 is a top view of the electronic device with a user interface presented on the display screen with no defects.

In general, the user interface 18 may include functional components 62 that are shown on the display screen 14, as seen in FIGS. 6-11. The functional components 62 may be generated by or associated with programs, applications, interactive menus, virtual objects, and the like, or combinations thereof. The functional components 62, may include for example, selectable icons, boxes, fields, keyboards, keypads, scroll and slide bars, movable widgets, combinations thereof, and the like. Some modes of operation of the touchscreen system 12 may require just one functional component 62 that is presented over most of the viewable area of the display screen 14, while other modes may require a plurality of functional components 62 that are presented in various areas of the display screen 14. As an example, the electronic device 10 (with no defects) is shown in FIG. 6 which includes the user interface 18 with eight functional components 62 being presented on the display screen 14.

Figure 7:
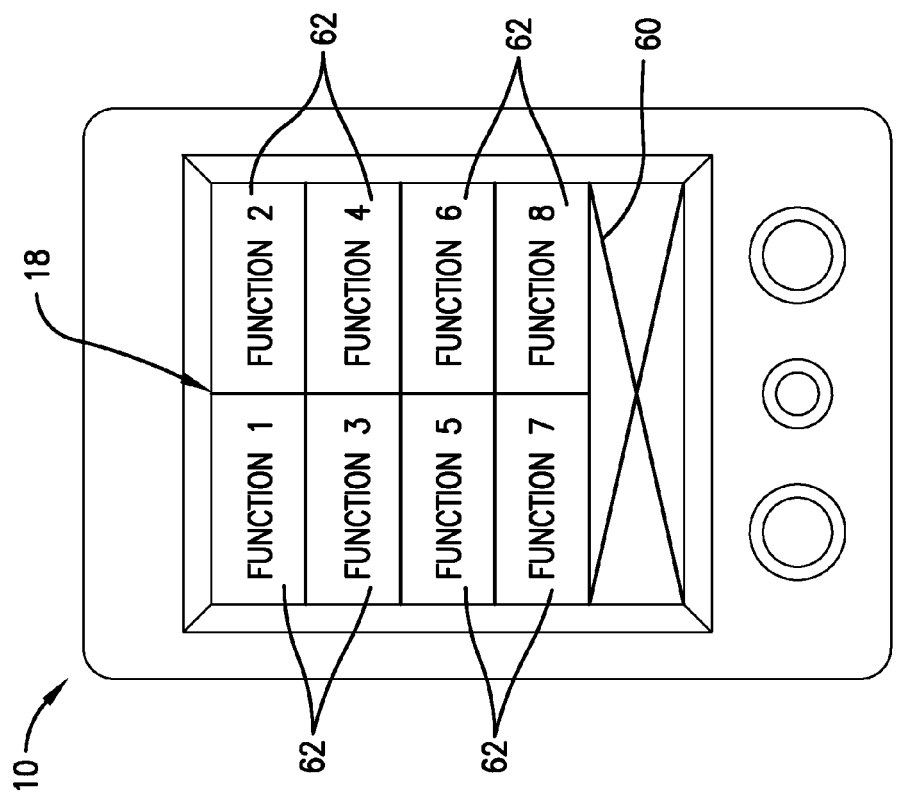
FIG. 7 is a top view of the electronic device with the user interface scaled in the vertical direction to adapt the user interface to account for a defect.
Figure 9:
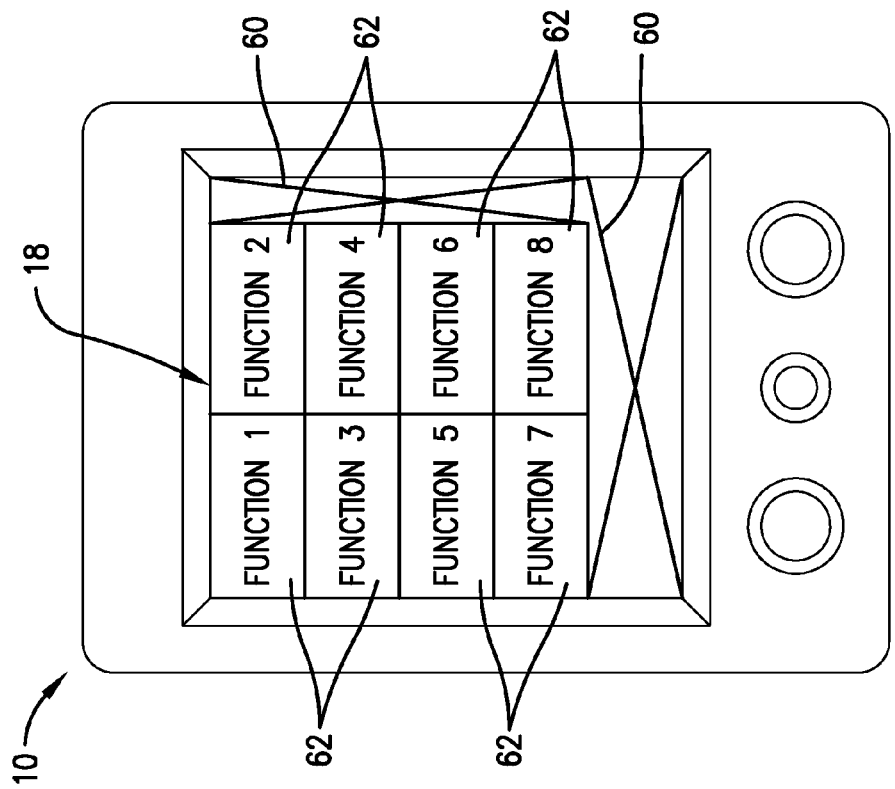
FIG. 9 is a top view of the electronic device with the user interface scaled in the horizontal and vertical directions to adapt the user interface to account for a defect.
Figure 8:
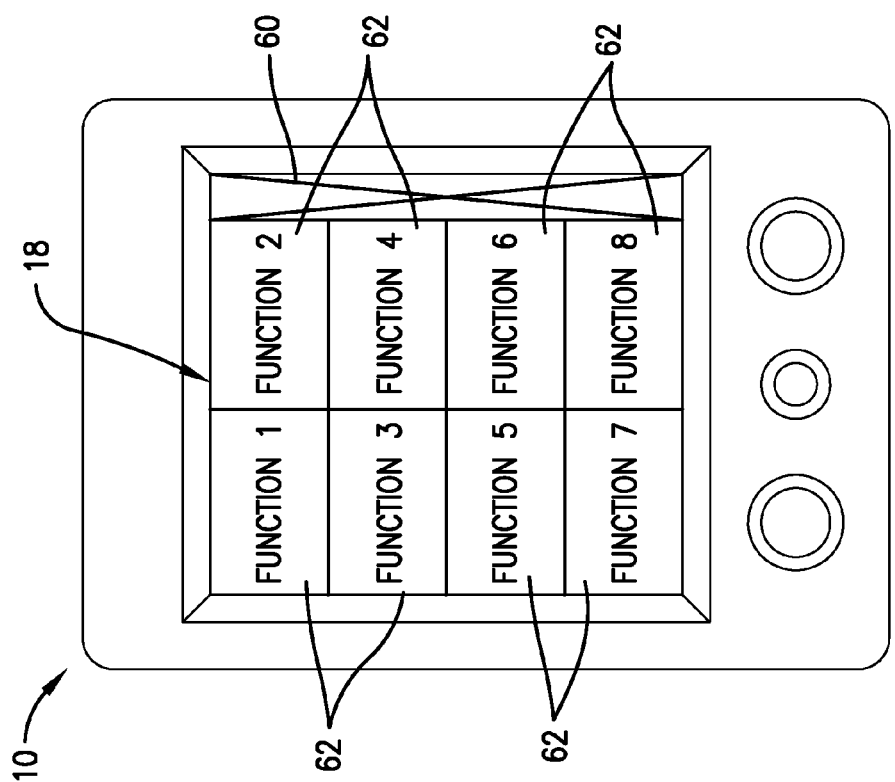
FIG. 8 is a top view of the electronic device with the user interface scaled in the horizontal direction to adapt the user interface to account for a defect.
Figure 10:
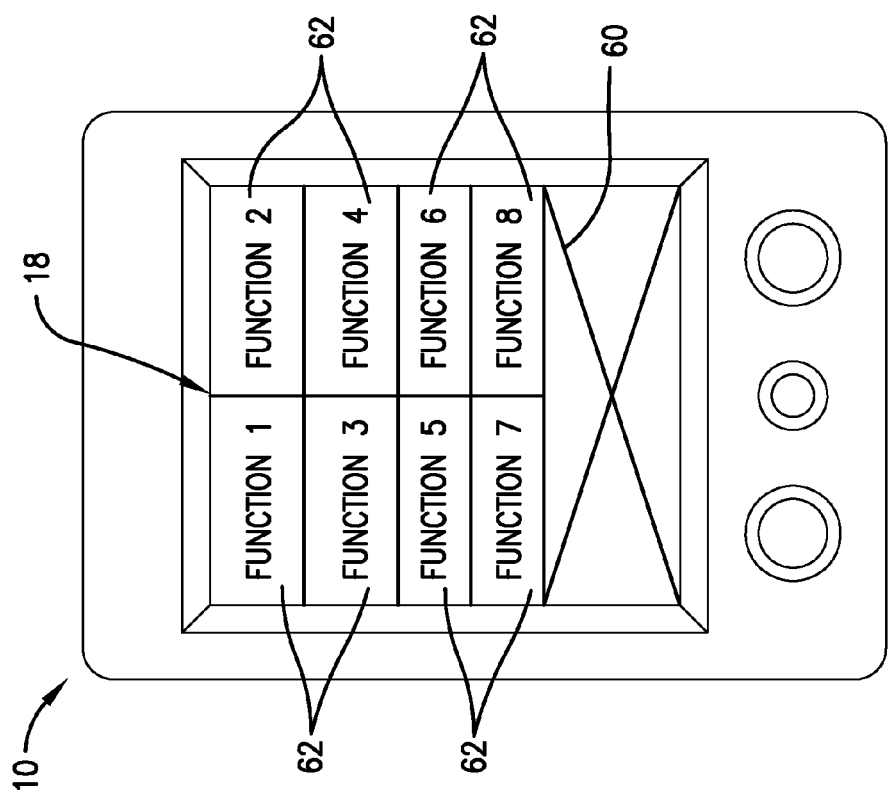
FIG. 10 is a top view of the electronic device with a portion of the user interface scaled in the vertical direction to adapt the user interface to account for a defect.

In some embodiments, the controller 16 may be programmed to scale the user interface 18 to fit on the display screen 14 in areas of the associated touchscreen system 12 that are not affected by the defect. This may require that at least a portion of the user interface 18 be presented in a reduced area than was previously available for presenting information on display screen 14. The controller 16 may scale the user interface 18 in the vertical direction, the horizontal direction, or both, depending, perhaps, on the location of the defect. An example of the controller 16 scaling all of the user interface 18 uniformly in the vertical direction is shown in FIG. 7. An example of the controller 16 scaling all of the user interface 18 uniformly in the horizontal direction is shown in FIG. 8. An example of the controller 16 scaling all of the user interface 18 uniformly in both the vertical direction and the horizontal direction is shown in FIG. 9. In some situations, the controller 16 may scale only a portion of the functional components 62 and allow other functional components 62 to remain their original size, as shown in FIG. 10.

Figure 11:
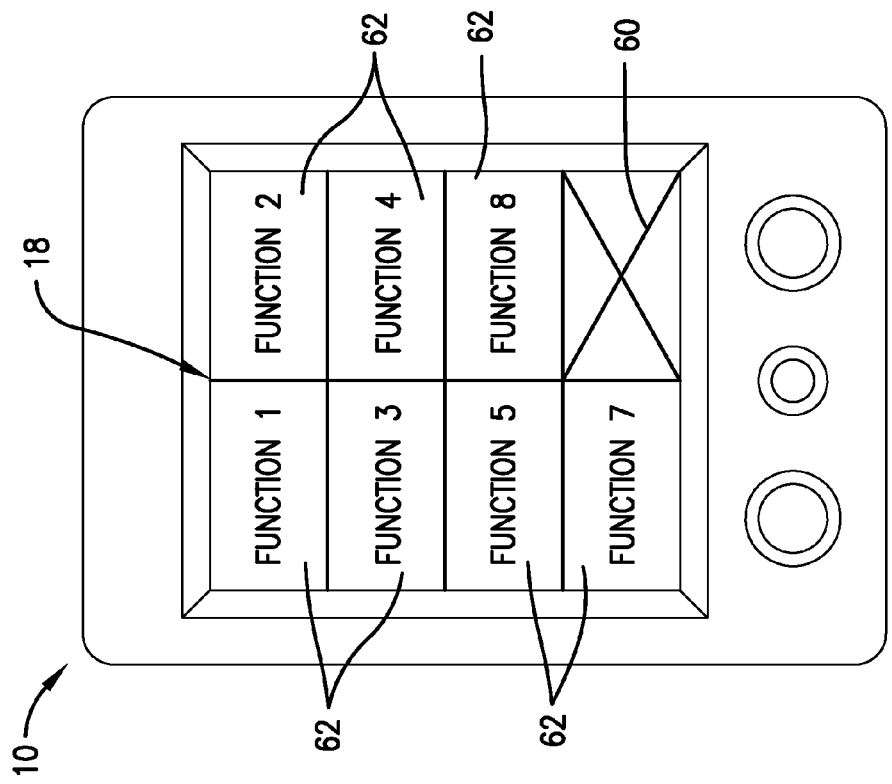
FIG. 11 is a top view of the electronic device with a portion of the user interface not presented in the area of the defect.

In other embodiments, the controller 16 may not scale the user interface 18, or it may be undesirable to employ scaling. Because the area of the display screen 14 associated with the defect of the touchscreen system 12 may be inoperable, at least some portion of the user interface 18 may not be presented. In such situations, the controller 16 may determine which portions of the user interface 18 should be presented. Priority for the functional components 62 of the user interface 18 may be determined based on the type of each functional component or other priority determining criteria assigned during manufacture of the device 10 and/or by a user of the electronic device 10. Some of the functional components 62 may be more important to the operation of the electronic device 10, while other functional components 62 may be less important. If a functional component 62 that is customarily presented in the area of the display screen 14 associated with the defect of the touchscreen system 12 is of lower priority (e.g., a video game), then that portion of the user interface 18 may be identified and the functional component 62 may not be presented. If a functional component 62 that is customarily presented in the area of the display screen 14 associated with the defect of the touchscreen system 12 is of higher priority (e.g., engine control), then that functional component 62 may be presented in the location associated with a lower-priority functional component 62 and the lower-priority functional component 62 may not be presented. An example of a higher-priority functional component 62 being presented in the location of a lower-priority functional component 62 is shown in FIG. 11.

Referring back to FIG. 6, it can be seen that the electronic device 10 includes the user interface 18 with eight functional components 62 being presented on the display screen 14, in which functional component 6 is presented adjacent to functional component 5, when there are no defects associated with the touchscreen system 12. The example of FIG. 11 illustrates a functional component 8 determined to be of a higher priority than functional component 6. In this example, the information associated with functional component 6 is no longer presented as a part of user interface 18 and the information associated with functional component 8 is now presented in the original location of functional component 6 adjacent to functional component 5.

The controller 16 may reconfigure functional components 62 to enable a user of electronic device 10 to access functional components 62 that are no longer presented on user interface 18. In some embodiments, the controller 16 may move any low-priority functional component(s) 62 that may no longer be presented to a sub-menu associated with functional components 62 that are presented on display screen 14. For example, a functional component 62 may be created that provides access to functional components 62 that are not presented on user interface 18.

In some embodiments, the electronic device 10 may store layouts for user interface 18 that present information display screen 14 in certain areas in a memory. Stored layouts provide a user interface 18 rearrangements that may be familiar to the user of electronic device 10 and minimize user confusion. For example, controller 16 may identify a defect the lower-right portion of the touchscreen system 12 and determine whether a stored layout presents information on the upper and lower-left portion of user interface 18. A suitable stored layout may be applied automatically to user interface 18 or presented as a menu option on display screen 14 for a user of electronic device 10. In some embodiments, a pre-defined standard for arranging information presented on user interface 18 may be used. For example, the user interface 18 may be reduced by a percentage (e.g., 50% of the display area). If the controller 16 determines that a touchscreen system 12 defect impacts 30% of the display screen 14 area, user interface 18 may be reduced to the 50% display area of display screen 14. Although 70% of the touchscreen system 12 is functional without defect, the user interface 18 may be presented in a pre-defined configuration that is familiar to the user over a reduced area to ensure that touch inputs may be accurately identified by a functioning portion of the touchscreen system 12.

An embodiment of the touchscreen system 12 may function as follows. The controller 16 may send the transmit signal 44 to the transmitters 20. Beams 42 corresponding to the transmit signal 44 may be transmitted by the transmitters 20 and received by the receivers 22. The controller 16 may receive the receive signals 48 from one or more of the receivers 22 and may determine if any of the receive signals 48 are stuck. If so, then the controller 16 may keep track of the time for which the receive signal 48 is stuck. Or, the controller 16 may evaluate the level of the stuck receive signal 48. If the receive signal 48 is stuck for too long, or if the level of the stuck receive signal 48 is outside of acceptable values, then the controller 16 may identify a defect associated with touchscreen system 12.

The controller 16 may analyze which receive signals 48 are stuck in order to determine the location of the defect. The controller 16 may perform calculations, access stored data, or utilize other algorithms to determine the area of the display screen 14 associated with the defect.

When the location of the defect is identified, the controller 16 may display a warning and/or malfunction indicator 60 on the display screen 14 in the area of the defect. The controller 16 may also reconfigure the user interface 18 in order to present user interface 18 only in the areas of the display screen 14 not associated with the defect. In some embodiments, the controller 16 may scale at least a portion of the user interface 18 to be presented in a smaller area of the display screen 14. The scaling may occur in the horizontal direction, the vertical direction, or both. In other embodiments, scaling may not be available or practical. The controller 16 may determine which portions of the user interface 18 may be presented in the areas of the display screen 14 not associated with the defect. The controller 16 may not present a portion of the user interface 18 that is customarily presented in the area of the display screen 14 associated with the defect if that portion has a lower-priority functionality than other functionality presented on display screen 14. The controller 16 may present the higher-priority functionality in an area of the display screen 14 that is customarily used to present a lower-priority functionality by removing the lower-priority functionality. In some embodiments, various information comprising the user interface 18 may be reorganized for presentation. In other embodiments, only the moved and removed functionalities may be impacted, with the rest of the user interface 18 continuing to present information in its customary location on display screen 14.

If the user cleans the touchscreen system 12 in the area of the defect or otherwise repairs the defect, then the controller 16 may reset the user interface 18 or may return it to its customary configuration, wherein the user interface 18 is presented over most of the viewable area of the display screen 14—including the area of the repaired defect. The user may then enter touch inputs to the touchscreen system 12 in the area where the defect used to be in order to interact with the electronic device 10.

The controller 16 may repeat the process of checking for stuck receive signals 48 indefinitely while the touchscreen system 12 remains in use.

Figure 12:
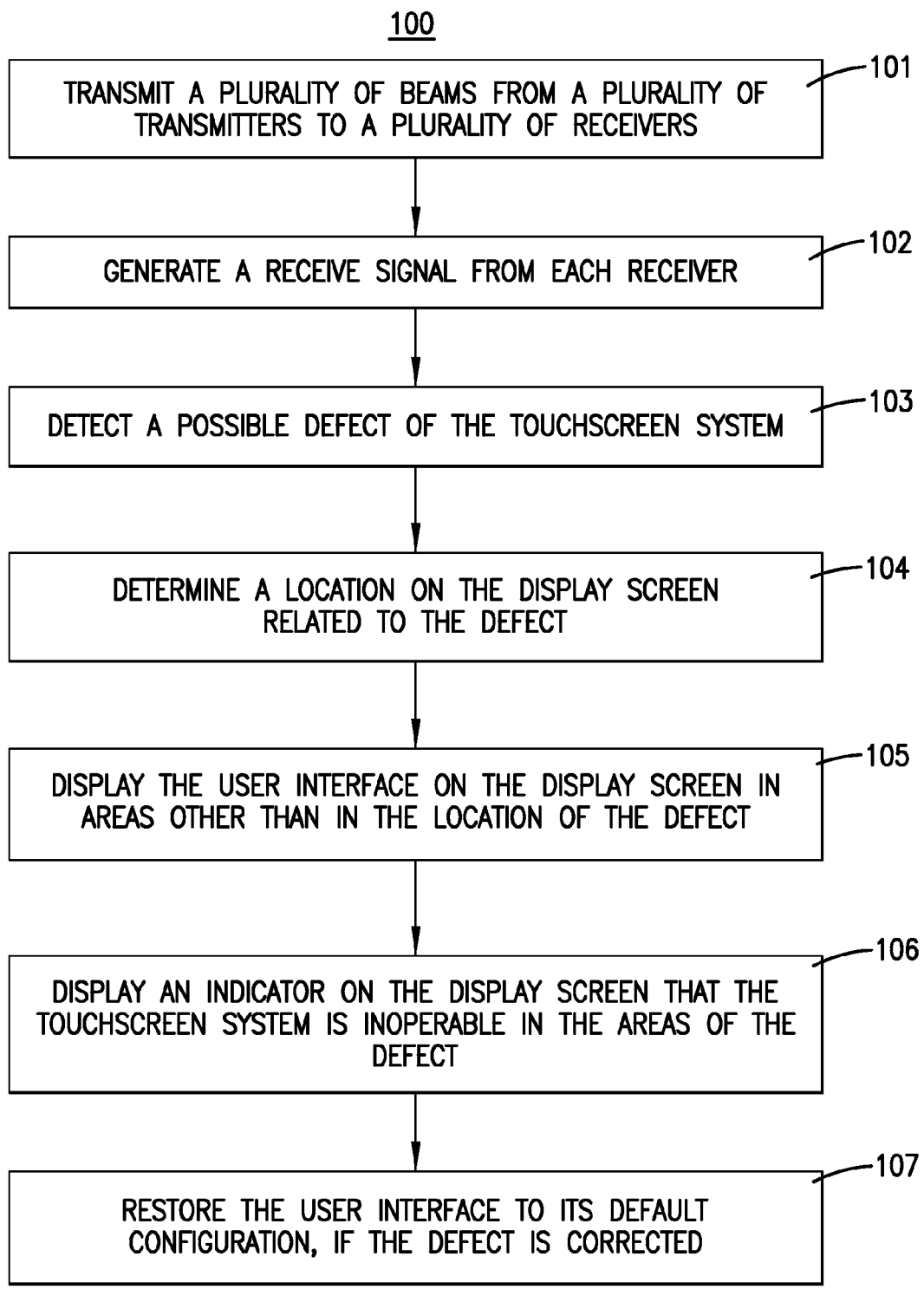
FIG. 12 is a flow diagram of at least a portion of the steps of a method of adapting a user interface for a touchscreen system display screen.

Steps of a method 100 for adapting a user interface 18 of a display screen 14 for a touchscreen system 12 implemented with infrared touchscreen technology, in accordance with various embodiments of the present invention, are shown in FIG. 12. The steps may be performed in the order as shown in FIG. 12, or they may be performed in a different order. Furthermore, some steps may be performed concurrently as opposed to sequentially. In addition, some steps may not be performed and/or other steps may be added.

In connection with step 101, a plurality of beams 42 are transmitted from a plurality of transmitters 20 to a plurality of receivers 22. Each beam 42 may correspond to a transmit signal 44, which typically has an amplitude that varies over time. The transmitters 20 and the receivers 22 may be placed around the perimeter of a display screen 14, and positioned such that each transmitter 20 is generally opposing one or more receivers 22. One or more beams 42 is transmitted from each transmitter 20. Each receiver 22 receives one or more beams 42 from the transmitters 20.

In connection with step 102, one or more of the receivers 22 generates a receive signal 48, which corresponds to the received beam 42 transmitted by a transmitter 20. Thus, the receive signal 48 may also have an amplitude that varies over time.

In connection with step 103, possible defects of the touchscreen system 12 are detected. Defects may be the result of debris on the display screen 14 interfering with touchscreen system 12 or a problem with either one or more transmitters 20 and/or one or more receivers 22 of touchscreen system 12. A status of all of the receive signals 48 is analyzed by the controller 16 to determine possible defects with touchscreen system 12. A defect may be identified by a receive signal 48 that does not operate as expected, including, but not limited to, a receive signal 48 that is stuck or not changing in amplitude over time as expected. Particularly, a defect may be identified by a receive signal 48 that does not vary for longer than a customary period of time (e.g., 5 seconds) or by a receive signal 48 that is received at a value outside of expected range. In some embodiments, the controller 16 may identify and store information related to problematic receive signals 48 in a memory device.

In connection with step 104, a location on the display screen 14 is determined that is related to the defect. The defect location is generally determined by associating the touchscreen system 12 with the display screen 14. The controller 16 may perform calculations, access stored data, or utilize other algorithms to determine the area of the display screen 14 associated with the touchscreen system 12 defect.

In connection with step 105, the user interface 18 is presented on the display screen 14 in areas other than in the location of the touchscreen system 12 defect. In some embodiments, the controller 16 may scale at least a portion of the user interface 18 to be presented in a smaller area of the display screen 14. The scaling may occur in the horizontal direction, the vertical direction, or both. In other embodiments, scaling may not be available or practical. The controller 16 may determine which portions of the user interface 18 may be presented in the areas of the display screen 14 not associated with the defect. The controller 16 may not present a portion of the user interface 18 that is customarily presented in the area of the display screen 14 associated with the defect if that portion has a lower-priority functionality than other functionality presented on the display screen 14. The controller 16 may present the higher-priority functionality in an area of the display screen 14 that is customarily used to present a lower-priority functionality by removing the lower-priority functionality. In connection with step 106, an indicator 60 is presented on the display screen 14 to notify a user of the electronic device 10 that the touchscreen system 12 is inoperable in the area of the defect. The controller 16 may display a warning message or an indicator 60 such as an "X" on the display screen 14 in the location of the defect.

In connection with step 107, the user interface 18 is restored to its customary default configuration, if the defect is corrected. Once the defect has been repaired, such as by cleaning or servicing display screen 14, the receivers 22, and/or transmitters 20, then the controller 16 may reconfigure the user interface 18 such that the user interface 18 is presented over most of the viewable area of the display screen 14—including the area of the repaired defect.

The defect may apply to a substantial area of the touchscreen system 12 rather than isolated areas. In some embodiments, the user interface 18 may be adapted for the entire display screen 14. For example, if the touchscreen system 12 defect lowers the number touch-sensitive areas (i.e., reduced touchscreen system 12 resolution), controller 16 may present fewer enlarged function components 62 to compensate for the defect.

As described above, FIG. 6 depicts the electronic device 10 without any defects, including a user interface 18 with eight functional components 62 being presented on the display screen 14. In some embodiments, presented function components may have originally been presented in a selected region of user interface 18 prior to the touchscreen system 12 defect. For example, controller 16 may identify eight function components 62 presented on user interface 18 and select function components 62 presented in the upper region for presentation on the user interface 18. As shown in FIG. 13, the presented function components 62 may be reduced to function component 1, function component 2, function component 3, and function component 4. The selected user interface 18 region may be based on a defect severity in different areas of the touchscreen system 12, configurable settings, user input, or a combination thereof. For example, controller 16 may enlarge function components 62 originally presented in an area of the user interface 18 based on a user input identifying a region of the user interface 18 containing function components 62 to be enlarged (e.g., upper, lower, center, left, right, etc). In some embodiments, function components 62 selected for presentation on user interface 18 may be based on priority of the function components 62 presented prior to the touchscreen system 12 defect. For example, controller 16 may identify function component 5, function component 7, function component 4, and function component 3 as having a higher-priority than other function components 62 and select the high-priority function elements 62 for presentation as user interface 18 as shown in FIG. 14.

Although the length and width of the touchscreen system 12 and display screen 14 are substantially similar in the examples above, it is to be understood that the techniques described herein are applicable to embodiments in which the touchscreen system 12 and display screen 14 are not substantially similar.

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

What is claimed is:

1. A method of adapting a user interface for a touchscreen system associated with a display screen, the method comprising the steps of:
    a) detecting, using a processing element, a defect in an area of the touchscreen system;
    b) determining, using the processing element, a location on the display screen related to the defect, the display screen presenting the user interface including one or more functional components selectable with a touch input over the viewable area of the display screen;
    c) adapting, using the processing element, the user interface on the display screen based on a priority of each functional component to compensate for the defect; and
    d) identifying, using the processing element, a touch input in an area of the touchscreen system associated with a selectable functional component of the adapted user interface as a selection of the functional component.

2. The method of claim 1, further comprising determining a priority associated with each functional component to identify high-priority functional components.

3. The method of claim 2, wherein the priority associated with each functional component is stored in a memory.

4. The method of claim 2, wherein the priority associated with each functional component is determined based on an importance or type of each functional component.

5. The method of claim 1, wherein high-priority functional components are included in the adapted user interface.

6. The method of claim 5, wherein the high-priority functional components are presented in an area of the user interface that is not associated with the defect.

7. The method of claim 5, wherein the area of the user interface that is not associated with the defect presented functional components having lower-priority than the high-priority functional components prior to step c).

8. The method of claim 1, further comprising determining a priority associated with each functional component to identify functional components having a lower-priority than the high-priority functional components, wherein the lower-priority functional components are not included in the adapted user interface.

9. The method of claim 8, wherein the adapted user interface includes a sub-menu providing access to lower-priority functional components that are not included in the adapted user interface.

10. The method of claim 1, wherein the adapted user interface has remapped the functional components based on the priority of each functional component.

11. The method of claim 1, further comprising presenting an indicator on the display screen that the touchscreen system is inoperable in the area of the defect prior to step c).

12. The method of claim 1, further comprising restoring the user interface to a default configuration, if the defect is corrected.

13. The method of claim 1, wherein step a) further comprises the steps of:
    transmitting a plurality of beams from a plurality of transmitters to a plurality of receivers,
    generating a receive signal from one or more of the receivers that detects at least one of the beams, and
    analyzing a status of the receive signals to detect the defect.

14. An adaptive touchscreen system comprising:
    a memory to store a priority associated with functional components;
    a display screen for presenting a user interface including one or more functional components selectable with a touch input over a viewable area of the display screen, the display screen comprising a touchscreen; and
    a controller configured to
        detect a defect in an area of the touchscreen,
        determine a location on the display screen related to the defect,
        determine the priority associated with each functional component to identify high-priority functional components,
        adapt the user interface based on the priority of each selectable functional component to present high-priority functional components of the user interface on the display screen in areas other than in the location of the defect, and
        identify a touch input in an area of the touchscreen system associated with a selectable functional component of the adapted user interface as a selection of the functional component.

15. The system of claim 14, wherein the controller is further configured to identifying functional components having a lower-priority than the high-priority functional components, wherein the lower-priority functional components are not included in the adapted user interface.

16. The system of claim 15, wherein the adapted user interface includes a sub-menu providing access to lower-priority functional components that are not included in the adapted user interface.

17. The system of claim 16, wherein at least one functional component presented on the adapted user interface provides access to the sub-menu.

18. The system of claim 14, wherein the adapted user interface has remapped the functional components based on the priority of each functional component.

19. The system of claim 14, further comprising:
    a plurality of transmitters for transmitting beams across the display screen, and
    a plurality of receivers for detecting the beams from the transmitters and generating receive signals, wherein the controller is in communication with the transmitters and the receivers and configured to analyze a status of the receive signals to detect the defect.

20. An adaptive touchscreen system comprising:

a memory to store a priority associated with functional components;

a display screen for presenting a user interface including one or more functional components selectable with a touch input over the viewable area of the display screen, the display screen comprising a touchscreen;

a plurality of transmitters for transmitting beams across the display screen;

a plurality of receivers for detecting the beams from the transmitters and generating receive signals;

a controller configured to:
 analyze a status of the receive signals,
 detect a defect in an area of the touchscreen,
 determine a location on the display screen related to the defect,
 determine the priority associated with each functional component to identify high-priority functional components,
 adapt the user interface based on the priority of each selectable functional component to present high-priority functional components of the user interface on the display screen in areas other than in the location of the defect, and
 identify a touch input in an area of the touchscreen system associated with a selectable functional component of the adapted user interface as a selection of the functional component.

* * * * *